Nov. 9, 1926.

Re. 16,458

G. A. ANDERSON

TRUCK SIDE FRAME

Original Filed Dec. 8, 1921 5 Sheets-Sheet 1

INVENTOR

Gustaf A. Anderson by Frank J. Mecklin his ATTORNEY

Nov. 9, 1926. Re. 16,458

G. A. ANDERSON

TRUCK SIDE FRAME

Original Filed Dec. 8, 1921 5 Sheets-Sheet 2

Inventor

Gustaf A. Anderson

By Ernest J. Mecklenburg his Attorney

Nov. 9, 1926. Re. 16,458
G. A. ANDERSON
TRUCK SIDE FRAME
Original Filed Dec. 8, 1921 5 Sheets-Sheet 3
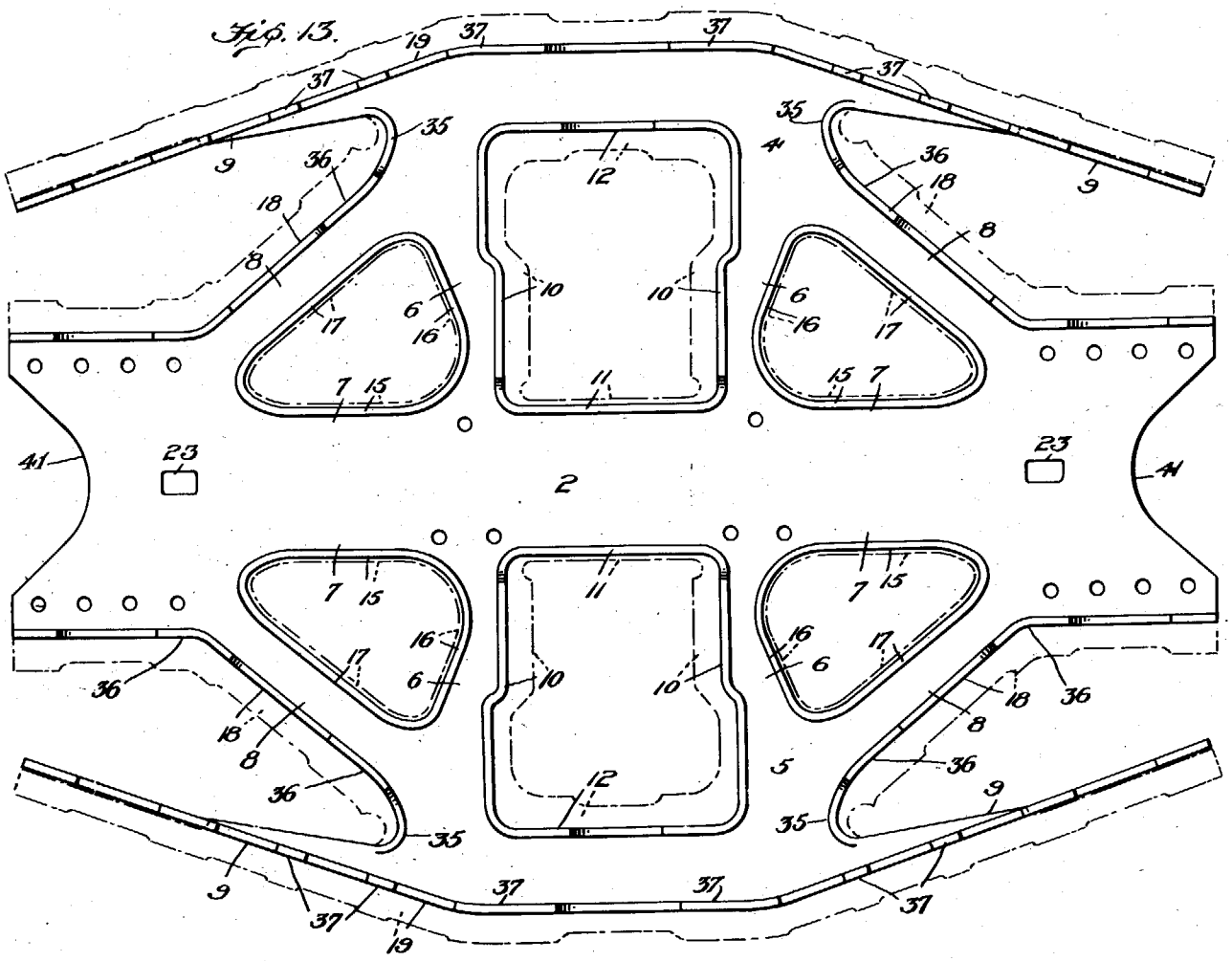
INVENTOR
Gustaf A. Anderson
by Ernest J. Mechlin
his ATTORNEY Nov. 9, 1926. Re. 16,458
G. A. ANDERSON
TRUCK SIDE FRAME
Original Filed Dec. 8, 1921 5 Sheets-Sheet 4
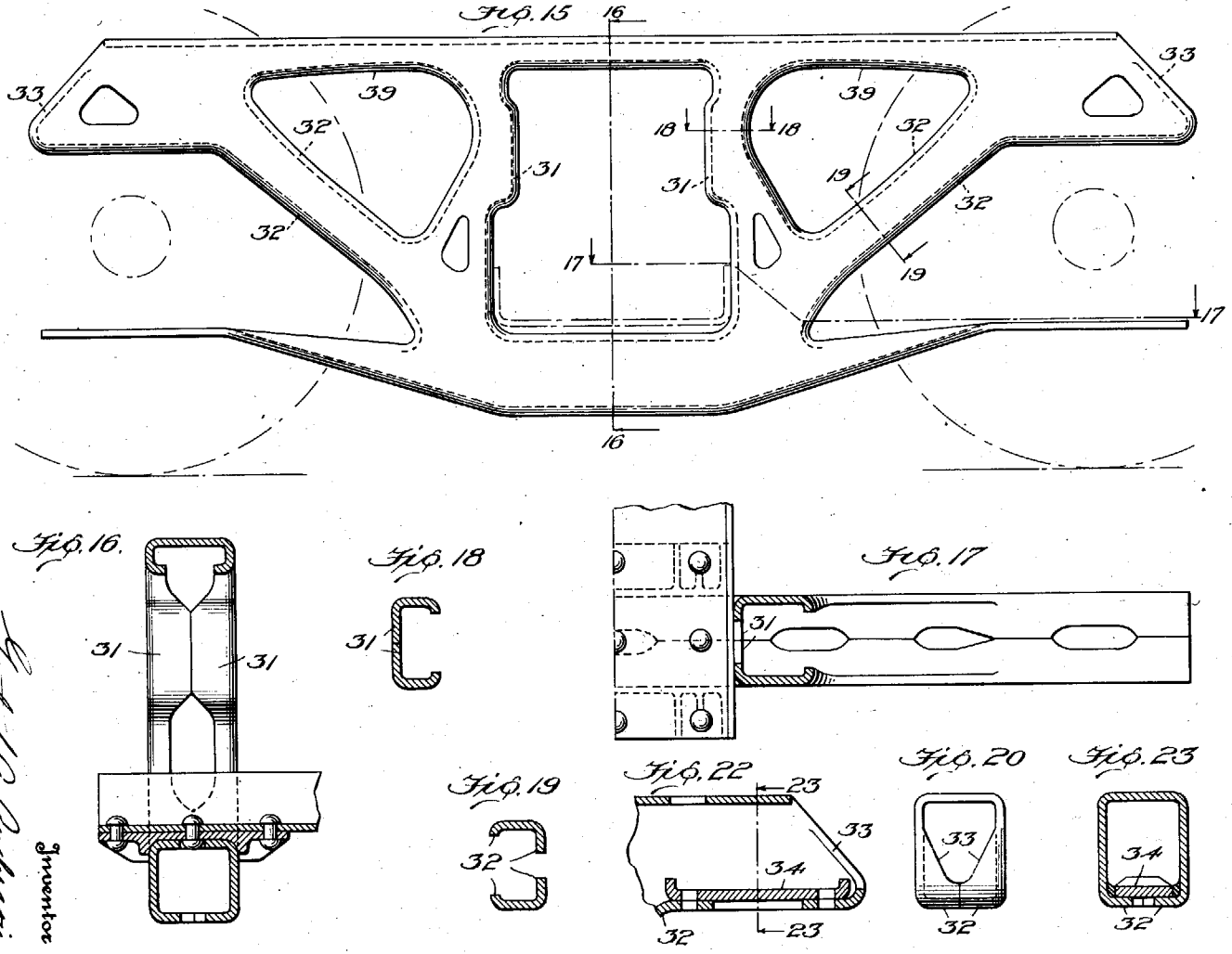
Inventor
Gustaf A. Anderson
By Ernest H. Mecklenburg
his Attorney Nov. 9, 1926. Re. 16,458

G. A. ANDERSON

TRUCK SIDE FRAME

Original Filed Dec. 8. 1921 5 Sheets-Sheet 5

INVENTOR

Gustaf A. Anderson by Frederick P. Machlin his ATTORNEY

Reissued Nov. 9, 1926.

Re. 16,458

UNITED STATES PATENT OFFICE.

GUSTAF ARVID ANDERSON, OF BALTIMORE, MARYLAND, ASSIGNOR, BY MESNE ASSIGNMENTS, TO THE SYMINGTON COMPANY, A CORPORATION OF MARYLAND.

TRUCK SIDE FRAME.

Original No. 1,422,074, dated July 11, 1922, Serial No. 520,849, filed December 8, 1921. Application for reissue filed March 5, 1926. Serial No. 92,604.

My invention relates to side frames for car trucks, and is designed to produce a construction which is very strong and stiff but comparatively light and in which maintenance charges are reduced to a minimum.

The principal feature of the invention consists in forming a car truck side frame with a sheet metal outer wall and a sheet metal inner wall, the said walls constituting a continuous sheet and each having a plurality of truck column portions, a plurality of top arch bar portions, a plurality of bottom arch bar portions, and a plurality of pedestal tie bar portions.

A further feature of the invention consists in constructing a car truck side frame from a continuous sheet of metal constituting an outer wall and an inner wall, said frame having its top extending in a straight line and said sheet having a plurality of top arch portions, a plurality of bottom arch bar portions, and a plurality of bolster openings.

Another feature of the invention consists in constructing a car truck side frame with a sheet metal outer wall and a sheet metal inner wall, the said walls being provided with corresponding flanges which are welded together.

A still further feature of the invention resides in constructing a car truck side frame with a sheet metal outer wall and a sheet metal inner wall, each of said walls being formed with a bolster opening and with a plurality of tapering pedestal tie bar portions, the cross sectional area of said tie bar portions being greater adjacent the bolster openings than at their outer ends.

Another feature of the invention consists in forming a car truck side frame with an outer wall of sheet metal and an inner wall of sheet metal and in providing each of said walls with transversely extending stiffening flanges projecting from one side only of their respective walls.

A further feature of the invention consists in forming a car truck side frame with a pedestal tie bar portion extending beneath the bolster opening of the side frame and adapted to connect the associated journal boxes, the central portion of the pedestal tie bar being hollow and of rectangular cross section below the bolster opening, the bottom wall of said central portion being prolonged in opposite directions so as to pass beneath the journal boxes, and the side walls of said central portion being prolonged to form upright flanges stiffening the pedestal tie bar on opposite sides of the bolster opening.

Another feature of the invention consists in forming a car truck side frame with an outer wall of sheet metal and an inner wall of sheet metal, each involving pedestal tie bar portions and in providing said tie bar portions with stiffening flanges which merge with the respective side walls adjacent the lower end of the bolster opening with which the side frame is furnished.

Another feature of the invention consists in forming a car truck side frame with a plurality of top arch bar portions, a plurality of bottom arch bar portions, and a plurality of truck column portions, the said bottom arch bar portions being of gradually increasing width in the planes of the truck side frame adjacent the truck column portions.

Another feature of the invention consists in forming a car truck side frame with a sheet metal outer wall and a sheet metal inner wall, each of said walls being provided with a series of correspondingly spaced lugs which are adapted to be welded together.

A further feature of the invention consists in forming a car truck side frame as a continuous sheet of metal constituting an outer wall and an inner wall in spaced relation to said outer wall and in providing each of said walls with top arch bar portions whose lower sides slope downwardly toward the respectively adjacent ends of the side frame, thus producing a top arch bar having its top in a straight line and its neutral axis arched, thereby effecting a virtual camber of the top arch bar.

A still further feature of the invention consists in the method of manufacturing a car truck side frame by forming from a sheet of metal a blank having corresponding side frame portions which are symmetrically disposed with respect to an axis of symmetry passing between them, bending corresponding portions of said blank to form flanges which project from the same side of the blank, folding the blank along a line which throughout its length is parallel to the said axis of symmetry, and uniting said flanges by welding.

There are other features of the invention pertaining to particular relations of parts and details of construction, all as will hereinafter appear.

In the drawings illustrating the invention, the scope whereof is pointed out in the claims:

Figure 10 is an inverted plan view of one half of the lower portion of the truck side frame shown in Fig. 1.

Figure 11 is an inverted plan view of an end portion of the truck side frame.

Figure 12 is a plan view of the portion of the truck frame illustrated in Fig. 11.

Figure 13 is a view illustrating a sheet metal blank for forming the side frame shown in Fig. 1.

Figure 14 is a view corresponding to Fig. 9, but illustrating a slightly modified construction.

Figure 15 is a side elevation of a car truck frame embodying a modified form of my invention, the spring plank and the truck wheels being shown in dotted lines.

Figure 16 is a sectional view on the line 16—16, Fig. 15, a portion of the spring plank being broken away.

Figure 17 is a detail sectional view of one half of the truck frame, the section being taken on the line 17—17, Fig. 15, and a portion of the spring plank being omitted.

Figure 18 is a detail sectional view on the line 18—18, Fig. 15.

Figure 19 is a detail sectional view on the line 19—19, Fig. 15.

Figure 20 is an end elevation of the upper part of the truck side frame shown in Fig. 15.

Figure 22 is a detail vertical section illustrating a modification of the portions of the side frame which extend over the journal boxes.

Figure 23 is a sectional view on the line 23—23, Fig. 22.

Figure 1:
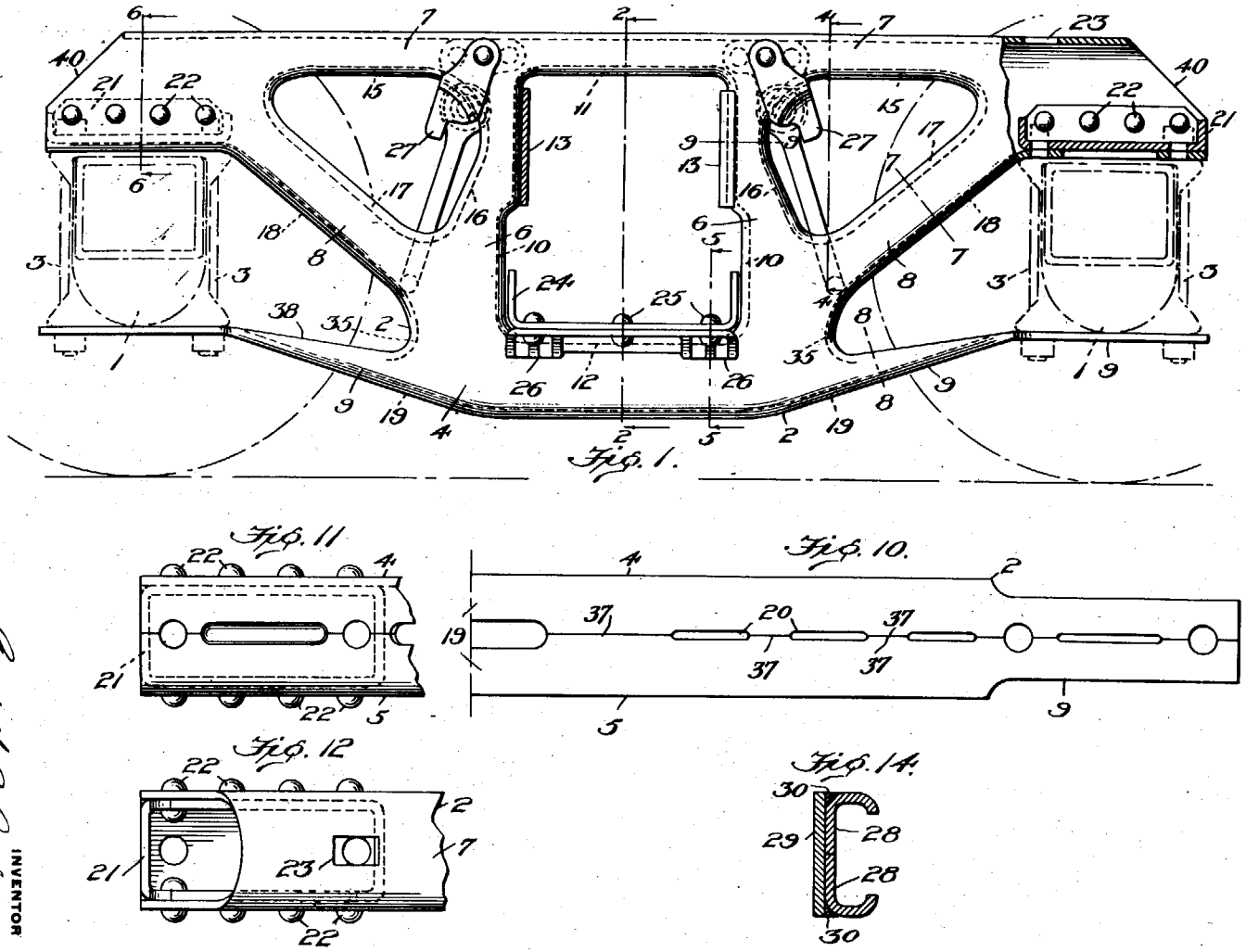
Figure 1 is a view, partly in side elevation and partly in vertical section, of a car truck side frame embodying the invention, the wheels and journal boxes of the car truck being shown in dotted lines.

In the drawings, 1 indicates the journal boxes and 2 indicates the side frame of a car truck to which said journal boxes are secured by journal box bolts 3 in a well known manner.

The side frame 2 of the truck is formed of sheet metal and comprises an outer wall 4 and an inner wall 5, the said walls being in spaced relation to each other and preferably being formed from a single continuous sheet. Each of said walls is provided with a plurality of truck column portions 6, a plurality of top arch bar portions 7, a plurality of bottom arch bar portions 8, and a plurality of pedestal tie bar portions 9, the truck column portions being spaced apart to form a bolster opening between them. The parts of the pedestal tie bar portions of the side frame which are located between the truck columns and the adjacent journal boxes 3 may advantageously be of tapering form, their greatest cross sectional areas being at their junctions with the respective truck columns. Such a construction not only imparts to the side frame increased ability to resist vertical loads but it also reinforces and supports the lower ends of the truck columns so that failure of the truck side frame at those points cannot well occur.

The bottom arch bar portions 8 of the outer wall of the truck, which extend at an oblique angle to the top arch bar and to the pedestal tie bar portions of the side frame, merge with and are integrally connected to the top arch bar portions 7 of the outer wall above the journal boxes at the ends of the truck, as also do the corresponding top arch bar and bottom arch bar portions of the inner wall of the side frame.

The side frame is stiffened against transverse thrusts by providing the inner and outer walls of the structure with stiffening flanges, the stiffening flanges with which the outer wall is furnished preferably extending toward the inner wall, and the stiffening flanges with which the inner wall is provided preferably corresponding to those of the outer wall and extending toward said outer wall. By thus forming these stiffening flanges they may be availed of for uniting the outer and inner walls of the truck side frame by welding. Moreover, this disposition of stiffening flanges on one side only of the respective walls of the truck enables said flanges to be made of maximum width, thereby increasing the rigidity and strength of the entire side frame. Each of the stiffening flanges preferably extends not more than one half the distance toward the opposite wall of the truck frame. This is more advantageous than making the flanges of unequal width, because the production of a wide flange at certain points of the structure would result in serious stretching of the metal, reducing its thickness and weakening the side frame at those points, whereas by forming the flanges of equal width the stretching of the metal is minimized and, moreover, the reduced section is located at the midline of the frame where the strength requirement is least, instead of appearing nearer the side walls of the frame where the strength requirement is greatest.

Figure 2:
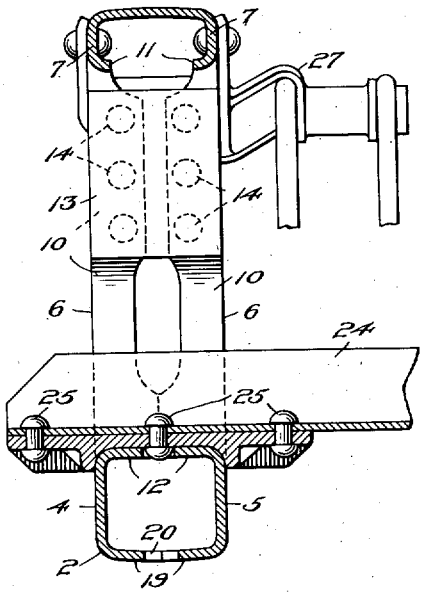
Figure 2 is a section on the line 2—2, Fig. 1, parts of the spring plank and of the brake beam hanger being broken away.
Figure 9:
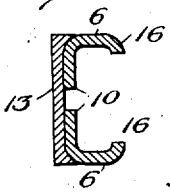
Figure 9 is a detail sectional view on the line 9—9, Fig. 1.
Figure 8:
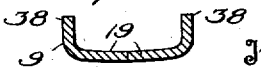
Figure 8 is a detail sectional view on the line 8—8, Fig. 1.

Stiffening flanges 10 which border the adjacent sides of the truck column portions 6 of the outer wall of the side frame and which extend toward the inner wall of said frame are preferably employed. They may merge into or be connected at their upper ends by a flange 11 which stiffens the central part of the top arch bar portion 7 of the outer wall. At their lower ends of the said flanges 10 may merge into a flange 12 projecting inwardly from the outer wall and bordering the lower end of the bolster opening. As so constructed the stiffening flanges 10, 11 and 12 completely border and reinforce the bolster opening in the outer wall of the side frame. The inner wall 5 is similarly provided with stiffening flanges 10, 11 and 12 corresponding to those heretofore described. The upper portions of the adjacent flanges 10 bordering the truck column portions 6 are preferably united by bolster chafing plates 13 which, as indicated by the dotted circles 14 in Fig. 2, may be connected to said flanges 10 by spot welding. As shown in Figs. 1 and 9, the vertical chafing plates 13 are preferably of such width that their vertical edges are adapted to form end stops for a truck bolster (not shown) which projects into the bolster opening of the side frame in the usual manner.

Between the truck column portions 6 and the respectively adjacent ends of the side frame the top arch bar portions 7 of the outer wall and of the inner wall are preferably reinforced by oppositely extending flanges 15. The outer edge of each bolster column portion 6 is likewise preferably reinforced by an internal flange 16, while the bottom arch bar portions 8 of the inner and outer walls may advantageously be provided along their upper edges with similar stiffening flanges 17, the said flanges 15, 16 and 17 of each wall being continuous and forming a substantially triangular figure.

Figure 3:
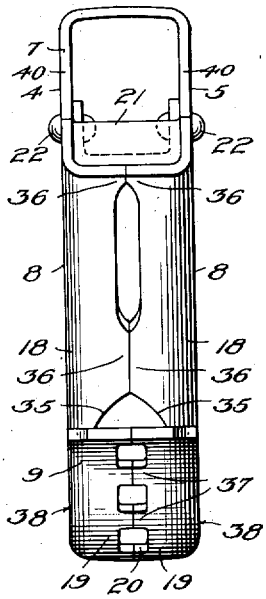
Figure 3 is an end view of the truck side frame shown in Fig. 1.
Figure 4:
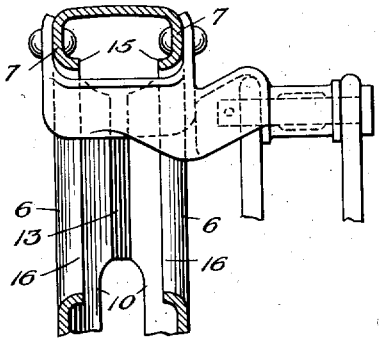
Figure 4 is a detail sectional view on the line 4—4, Fig. 1.
Figure 6:
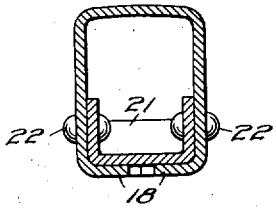
Figure 6 is a detail sectional view on the line 6—6, Fig. 1.
Figure 7:
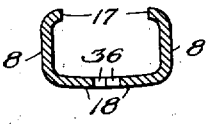
Figure 7 is a detail sectional view on the line 7—7, Fig. 1.
Figure 5:
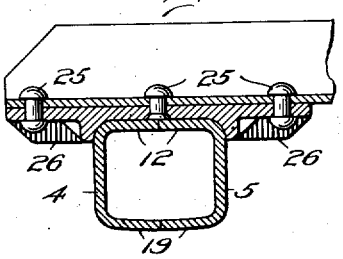
Figure 5 is a detail sectional view on the line 5—5, Fig. 1.

Along their lower edges the bottom arch bar portions 8 of the side frame walls are stiffened by internal flanges 18 which are preferably prolonged so as to extend over the journal boxes and also to reinforce the junctions of the said arch bars with the pedestal tie bars 9. The stiffening flanges 18 are tapered or reduced in height adjacent the respective junctions of the bottom arch bar portions and pedestal tie bar portions of the side frame, so as to merge with the side walls of the frame, as indicated at 35, thus permitting the side wall portions of the bottom arch bars to be increased in width at their junctions with the truck columns 6 and arch bar portions 8 so as effectively to transfer the stress in the flanges 18 of the bottom arch bars to the side walls of the truck frame. The inner margins of these flanges 18 are desirably formed with opposed spaced lugs or projections 36 which bridge the space between the side walls and contact each other, as shown in Figures 3, 7 and 13. The opposing lugs 36 are preferably welded together electrically. The spacing of the welding lugs of the flanges 18 provides openings through the lower sides of the bottom arch bars allowing moisture to be drained from the interior of said arch bars, thus reducing the formation of rust.

The outer wall and the inner wall of the side frame are rigidly united at the bottom by electrically welding together the abutting portions of flanges 19 with which the said walls are respectively provided. These flanges which pass beneath the journal boxes 1 and are preferably continuous along the entire bottom edge of the side frame, may have their opposed edges formed as a series of lugs 37 (see Figs. 3 and 10), thus not only affording drainage openings 20 but also in large measure confining any injury to the metal which may be caused by the electric welding to points remote from the side walls of the frame, which latter are the main stress carrying parts of the structure.

Portions of the side walls 4 and 5, together with the flanges 12 and 19 thereon form a pedestal tie bar which is hollow and of rectangular cross section below the bolster opening of the side frame, the bottom wall of said central portion thus formed being prolonged in opposite directions so as to pass beneath the journal boxes of the side frame, and the side walls of said central portion being prolonged to form tapering upright flanges 38 which stiffen the pedestal tie bar on opposite sides of the bolster opening.

The top of the truck side frame extends in a straight line. This enables the sheet from which the frame is formed to be simply folded, thus avoiding the stretching of the metal which would be incident to a shaping or pressing process if the top of the frame were not straight. To cause the top arch bar portions of the frame to have the effect of a cambered compression member, notwithstanding that the upper side of the frame lies in a straight line, the lower sides 39 of the top arch bar portions on opposite sides of the bolster opening preferably slope downwardly toward the respectively adjacent ends of the side frame, as shown in Fig. 15, so that they are of greater depth at points adjacent their junctions with the corresponding bottom arch bars 8 than at points nearer the center of the side frame.

The portions of the side frame which extend over the journal boxes are preferably reduced in height at their extremities, as shown at 40, their outer ends being formed entirely as parts of the side walls of the frame. Provision for this feature of construction may be made by forming the sheet metal blank from which the side frame is produced with oppositely disposed V-shaped recesses 41 cutting away the metal desired to be eliminated at the outer ends of the side frame above the journal boxes.

The portions of the side frame which extend over the journal boxes 1 are preferably reinforced and laterally stiffened by flanged castings 21 which are, in the present embodiment, located between the walls of the side frame and are secured thereto by means of rivets 22, although welding may be employed for the connection, if so desired, as for the chafing plates 13. These reinforcing members are formed with suitable openings to receive the journal box bolts 3, which also pass through corresponding circular openings, formed by providing registering semicircular openings or notches in the opposite flanges. The inner journal box bolts may be provided with T heads rather than with square heads, thus enabling the openings 23 formed in the top arch bar for the introduction of said journal box bolts to be made somewhat narrower.

The spring plank 24 of the truck is preferably rigidly secured by means of rivets 25 to a saddle casting or seat member 26 which rests upon the side frame at the lower end of the bolster opening thereof, the said saddle being preferably formed with downwardly projecting portions which embrace the neighboring portion of the frame and thus serve to resist any spreading or separation of the walls of the side frame at this point. Separation of the inner and outer walls of the frame adjacent the lower end of the bolster opening may be also provided against by electrically welding together the abutting edges of the stiffening flanges 12 and the abutting edges of the adjacent portions of the flanges 10 bordering the truck columns.

The brake hanger brackets 27 preferably employed extend between the adjacent top and bottom arch bar portions of the side frame and embrace the outer and inner walls of the top arch bar, thus increasing the stiffness of the construction. As well shown in Figs. 2 to 6, inclusive, the upper and lower surfaces produced in the flanging and pressing operation of the sheet from which the side frame is formed may be crowned. This crowning is advantageous not only because it increases the strength of the structure but also because it enables the abutting edges of the stiffening flanges to be most satisfactorily brought together for welding, and in some instances promotes the drainage of moisture from the interior of the truck side frame. The surfaces of the truck frame forming seats for the journal boxes and for the spring plank are preferably flattened instead of being crowned.

In the modified form of construction shown in Fig. 14, the internal stiffening flanges 28 bordering the truck column portions of the outer and inner walls of the side frame extend sufficiently far transversely of the frame to be welded together. In this construction a simple plate 29 which may be spot welded at its edges to the truck column portions, as indicated at 30, serves as a bolster chafing plate or wear pad.

The sheet metal blank from which the truck side frame is constructed is preferably of the form shown in Fig. 13, the original outline of the blank prior to the production of the stiffening flanges being indicated by dot and dash lines. The portions of the blank which correspond to features of construction heretofore described have been indicated by the appropriate reference numerals. As will be seen, the blank is formed with a plurality of bolster openings, a plurality of top arch bar portions, a plurality of bottom arch bar portions, and a plurality of pedestal tie bar portions, the top arch bar portions and the corresponding bottom arch bar portions being upon opposite sides of the respective bolster openings. The bolster openings are symmetrically disposed upon opposite sides of a line passing between them. In the particular form of blank illustrated, which is the preferred form, the top arch bar portions of the blank, rather than the pedestal tie bar portions thereof, extend between the bolster openings.

Figure 21:
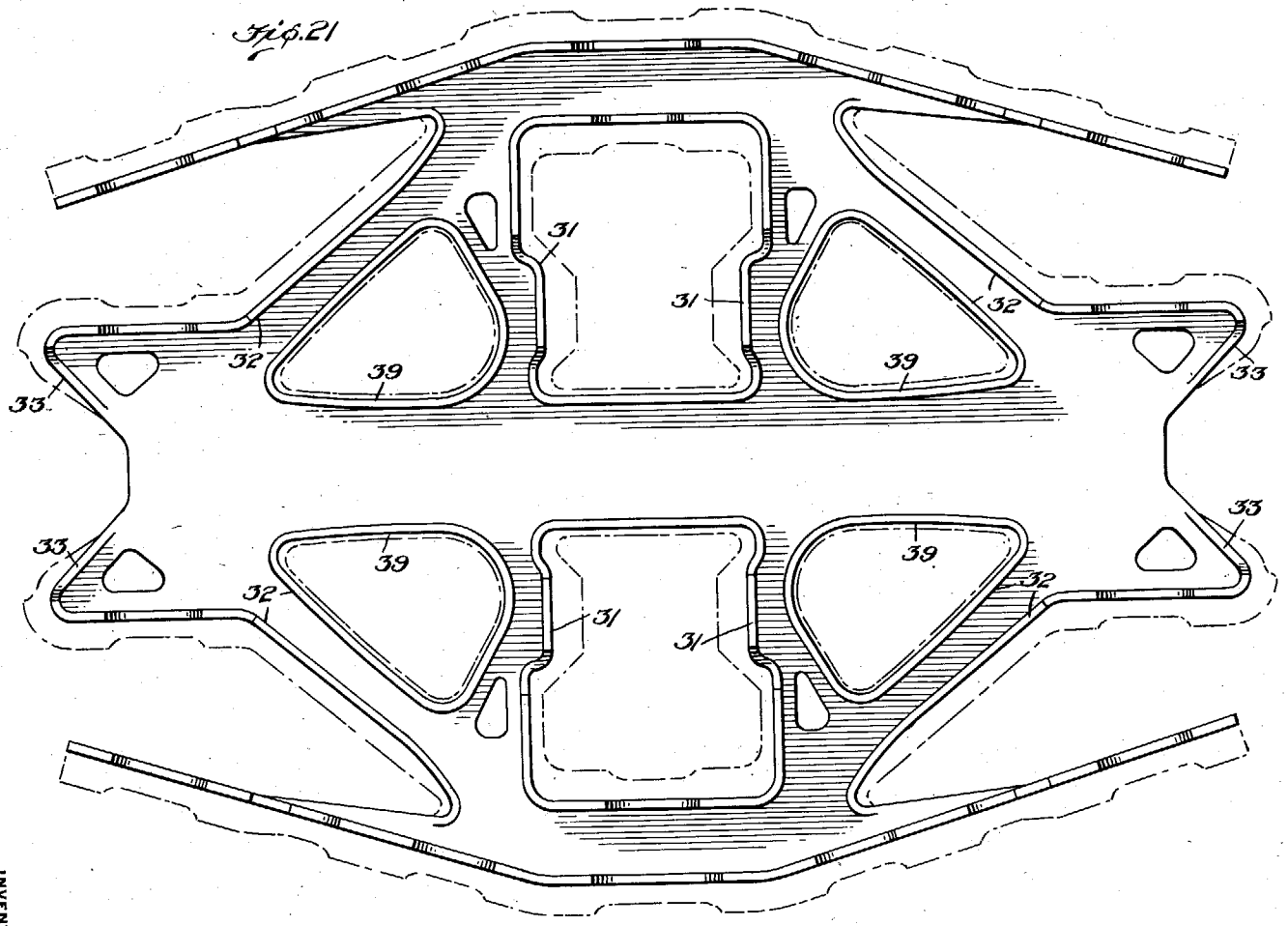
Figure 21 is a view illustrating a sheet metal blank for forming the truck side frame shown in Fig. 15.

The modified form of construction shown in Figs. 15 to 20, inclusive, may be produced from a sheet metal blank of the form illustrated in Fig. 21, the original outline of the blank prior to the production of the stiffening flanges being indicated by dot and dash lines. Except for the details of construction hereinafter referred to, this modified form of truck side frame is substantially the same as the structure shown in the principal figures of the drawings. Instead of employing bolster chafing plates the internal bordering flanges 31 of the truck columns of this modified form of side frame are adapted to contact directly with the sides of the truck bolster (not shown), the abutting edges of said flanges being welded together electrically; and instead of welding together the stiffening flanges of the bottom arch bar portions of the inner and outer walls of this form of truck frame, the stiffening flanges 32 of the bottom arch bar portions of the frame are made somewhat shorter so that a space or slot is formed between them. For the purpose of giving transverse stiffness to the portions of the side frame which extend over the journal boxes the outer wall and the inner wall of the frame are provided with oppositely extending triangular flanges 33 forming gussets or braces which are preferably welded together along their abutting edges. When the ends of the truck frame are provided with reinforcing gusset flanges 33 it is preferred to employ flanged plates 34 for reinforcing the side frame above the journal boxes, the said plates being welded to the interior of the side frame and being provided with suitable openings for journal box bolts. The flanges of the reinforcing plates 34 are adapted to form nut locks for the heads of the journal box bolts.

It will be perceived that a car truck side frame embodying the invention may be manufactured by first forming from a plain plate or sheet of metal a blank having corresponding side frame portions which are symmetrically disposed with respect to an axis of symmetry of the blank passing between them. Corresponding portions of the blank are bent to form flanges which project from the same side thereof, the blank being then folded so as to cause the portion thereof which constitutes the top of the side frame to extend in a straight line parallel throughout to the axis of symmetry of the blank. The flanges are then finally united by welding. The reinforcing plates or castings 21 are then placed in position and connected to the side frame, as well as the bolster chafing plates 13, if used.

It will be noted that a truck frame embodying my invention not only has the merit of being constructed of light and reliable material, but its parts are so formed and combined that the points subjected to greatest strains in service are rendered exceedingly strong. It will also be perceived that the construction makes it possible to avoid the use of rivets which are subjected to shearing strains.

I claim:—

1. A car truck side frame involving a sheet metal outer wall and a sheet metal inner wall integrally connected thereto in spaced relation therewith, each of said walls having a plurality of truck column portions, a plurality of top arch bar portions, a plurality of bottom arch bar portions and a plurality of pedestal tie bar portions.

2. A car truck side frame involving a sheet metal outer wall and a sheet metal inner wall, each of said walls having a plurality of truck column portions, a plurality of top arch bar portions, a plurality of bottom arch bar portions, and a plurality of pedestal tie bar portions.

3. A car truck side frame comprising top arch bar portions, bottom arch bar portions, pedestal tie bar portions, and truck columns integrally connected to said several portions, said top and bottom arch bar portions and said truck columns each being formed with an outer wall and with an inner wall in spaced relation to said outer wall.

4. A car truck side frame involving a sheet metal outer wall having pedestal tie bar portions, and a sheet metal inner wall provided with pedestal tie bar portions and spaced with relation to said outer wall, said outer wall being provided with stiffening flanges extending toward said inner wall, and said inner wall being provided with stiffening flanges extending towards said outer wall, said flanges being welded together.

5. A car truck side frame involving a sheet metal outer wall, and a sheet metal inner wall spaced with relation thereto, each of said walls having a plurality of truck column portions, a plurality of top arch bar portions, a plurality of bottom arch bar portions and a plurality of pedestal tie bar portions, said truck column portions of said outer wall being provided with stiffening flanges which extend toward said inner wall, and said truck column portions of said inner wall being provided with stiffening flanges which extend toward said outer wall.

6. A car truck side frame involving a sheet metal outer wall, and a sheet metal inner wall spaced with relation thereto, said outer wall and said inner wall respectively being provided with corresponding flanges which are welded together.

7. A car truck side frame involving a sheet metal outer wall, and a sheet metal inner wall integrally connected thereto in spaced relation therewith, said outer wall and said inner wall respectively being provided with corresponding flanges which are welded together.

8. A car truck side frame involving a sheet metal outer wall, and a sheet metal inner wall spaced with relation thereto, each of said walls having a plurality of truck column portions and having stiffening flanges located between said walls and respectively bordering said truck column portions.

9. A car truck side frame involving a sheet metal outer wall, and a sheet metal inner wall spaced with relation thereto, each of said walls having a plurality of truck column portions, a plurality of top arch bar portions, and a plurality of bottom arch bar portions, said truck column portions and said bottom arch bar portions being respectively provided with bordering flanges located between said walls.

10. A car truck side frame involving a sheet metal outer wall, and a sheet metal inner wall spaced with relation thereto, each of said walls having a plurality of truck column portions, a plurality of top arch bar portions, and a plurality of bottom arch bar portions, said bottom arch bar portions of said outer and inner walls being provided with corresponding flanges which are welded together.

11. A car truck side frame involving an outer wall of sheet metal, and an inner wall of sheet metal, each of said walls having a plurality of truck column portions, a plurality of top arch bar portions, a plurality of bottom arch bar portions, and a plurality of pedestal tie bar portions, said top and bottom arch bar portions and said pedestal tie bar portions of each of said walls being integrally united to the respective truck column portions.

12. A car truck side frame involving an outer wall of sheet metal, and an inner wall of sheet metal, each of said walls having a plurality of truck column portions, a plurality of top arch bar portions, a plurality of bottom arch bar portions, and a plurality of pedestal tie bar portions, said outer wall and said inner wall being respectively provided with stiffening flanges.

13. A car truck side frame involving a continuous sheet of metal having a plurality of bolster openings therein and a plurality of pedestal tie bar portions, said bolster openings being in register with each other.

14. A car truck side frame involving a continuous sheet of metal constituting an outer wall and an inner wall in spaced relation to said outer wall, said sheet being provided with a plurality of registering bolster openings and with a plurality of pedestal tie bar portions.

15. A car truck side frame involving a continuous sheet of metal constituting an outer wall and an inner wall in spaced relation to said outer wall, said outer wall being provided with a bolster opening and with a plurality of pedestal tie bar portions, said inner wall being provided with a bolster opening and with a plurality of pedestal tie bar portions, and corresponding tie bar portions of said outer and inner walls being rigidly connected.

16. A car truck side frame involving a sheet metal outer wall, and a sheet metal inner wall, each of said walls being formed with a plurality of truck column portions and with a plurality of pedestal tie bar portions, the cross sectional area of said tie bar portions being greater adjacent said truck column portions than at the outer ends of said tie bar portions.

17. A car truck side frame involving a continuous sheet of metal constituting an outer wall and an inner wall, each of said walls having a bolster opening therein and being provided with tapering pedestal tie bar portions.

18. A car truck side frame, said frame having its top in a straight line and involving a continuous sheet of metal constituting an outer wall and an inner wall, said sheet having a plurality of top arch bar portions a plurality of bottom arch bar portions, and a plurality of bolster openings.

19. A car truck side frame involving a sheet metal outer wall, and a sheet metal inner wall, each of said walls having a plurality of truck column portions and a plurality of top-arch bar portions, and reinforcing members located between and secured to said arch bar portions, said reinforcing members having openings adapted to receive journal box bolts.

20. A car truck side frame involving a sheet metal outer wall, a sheet metal inner wall spaced from said outer wall, each of said walls having a bolster opening, a plurality of top arch bar portions and a plurality of bottom arch bar portions, said top arch bar portions being provided with flanges which extend toward each other, and brake hanger means extending between said top and bottom arch bar portions and secured to and embracing said top arch bar portions.

21. A car truck side frame involving an outer wall of sheet metal, and an inner wall of sheet metal, each of said walls being provided with stiffening flanges, said flanges extending beyond one side only of their respective walls.

22. A car truck side frame involving a continuous sheet of metal constituting an outer wall and an inner wall in spaced relation to said outer wall, said sheet being provided with transversely crowned flanges.

23. A car truck side frame involving a sheet metal outer wall and a sheet metal inner wall, the said walls being joined at the upper part of the side frame to constitute a continuous sheet, the portion of said sheet joining said walls being crowned transversely of the side frame.

24. A car truck side frame involving a sheet metal outer wall, and a sheet metal inner wall, each of said walls being formed with a plurality of truck column portions and with a plurality of pedestal tie bar portions, the corresponding pedestal tie bar portions of the said walls having spaced portions affording a drainage opening.

25. A car truck side frame involving a sheet metal outer wall, and a sheet metal inner wall, each of said walls being formed with a plurality of truck column portions, a plurality of top arch bar portions and a plurality of bottom arch bar portions, the corresponding bottom arch bar portions of said walls having spaced portions affording a drainage opening.

26. A blank for a side frame member of a car truck, said blank having a plurality of bolster openings therein and being provided with a plurality of pedestal tie bar portions symmetrically disposed on opposite sides of a line passing between said bolster openings and between said tie bar portions.

27. A blank for a side frame member of a car truck, said blank being of sheet metal and having a plurality of bolster openings and being provided on opposite sides of the said bolster openings with a plurality of pedestal tie bar portions.

28. A blank for a side frame member of a car truck, said blank being of sheet metal and having a plurality of bolster openings therein and being provided on opposite sides of said bolster openings with top arch bar portions and with pedestal tie bar portions and with bottom arch bar portions extending at an oblique angle to said top arch bar portions and to said pedestal tie bar portions.

29. A blank for a side frame member of a car truck, said blank being of sheet metal and having an axis of symmetry dividing said blank into two portions each of which has a bolster opening, top arch bar portions, pedestal tie bar portions and bottom arch bar portions.

30. A blank for a side frame member of a car truck, said blank being of sheet metal and having a plurality of spaced bolster openings symmetrically disposed upon opposite sides of a line passing between them, and said blank also being provided with a plurality of pedestal tie bar portions extending at an oblique angle to said line.

31. A blank for a side frame member of a car truck, said blank being of sheet metal and having a plurality of pedestal tie bar portions symmetrically disposed upon opposite sides of a line passing between them and extending at an oblique angle to said line.

32. A blank for a side frame member of a car truck, said blank being of sheet metal and having a plurality of pedestal tie bar portions symmetrically disposed upon opposite sides of a line passing between them.

33. A blank for a side frame member of a car truck, said blank being of sheet metal and having a portion adapted to form an inner wall of said side frame and a portion adapted to form an outer wall of said frame, parts of said outer wall portion and corresponding parts of said inner wall portion being adapted to extend over respective journal boxes, and said blank having oppositely disposed V-shaped recesses adapted to form openings in the side frame above the respective journal boxes and effecting a reduction of height of the outer parts of said wall portions which extend over the journal boxes.

34. A car truck side frame involving a sheet metal outer wall, a sheet metal inner wall spaced with relation thereto, each of said walls having a plurality of truck column portions and having flanges located between said walls and respectively bordering said truck column portions, and bolster chafing plates respectively secured to the said flanges which are adjacent each other.

35. A car truck side frame involving a sheet metal outer wall, a sheet metal inner wall spaced with relation thereto, each of said walls having a plurality of truck column portions and having stiffening flanges located between said walls and respectively bordering said truck column portions, and a plurality of bolster chafing plates respectively secured to said flanges to constitute means for connecting said walls, the vertical edges of said chafing plates being adapted to form end stops for a truck bolster.

36. A car truck side frame involving a continuous sheet of metal forming inner and outer walls and a plurality of pedestal tie bar portions.

37. A car truck side frame having a bolster opening therein and provided with a pedestal tie bar portion extending beneath said bolster opening and adapted to connect journal boxes associated with the side frame, the central portion of said pedestal tie bar being hollow and of rectangular cross section below the bolster opening, the bottom wall of said central portion being prolonged in opposite directions and being adapted to pass beneath the journal boxes of the side frame, and the side walls of said central portion being prolonged to form upright flanges stiffening said pedestal tie bar on opposite sides of the bolster opening.

38. A car truck side frame having portions adapted to extend over the respective journal boxes with which the side frame is associated, said side frame involving a continuous sheet of metal constituting an outer wall and an inner wall, said walls being integrally united at the top of said side frame by a portion of said sheet, the top of said side frame being formed in a straight line, and the outer ends of said portions extending over the journal boxes being wholly in the respective planes of the said walls.

39. A car truck side frame having portions adapted to extend over the respective journal boxes with which the side frame is associated, said side frame involving a continuous sheet of metal constituting an outer wall and an inner wall, said walls being integrally united at the top of said frame by a portion of said sheet, the top of said side frame being formed in a straight line, the outer ends of said portions extending over the journal boxes being wholly in the respective planes of the said walls, and the said portions of the frame which extend over the journal boxes being of less height at their extremities than at points removed from said extremities.

40. A car truck side frame involving a sheet metal outer wall and a sheet metal inner wall each comprising a top arch bar portion, a bottom arch bar portion, pedestal tie bar portions and truck columns integrally connected to said several portions, each of said walls being provided with stiffening flanges extending toward the other wall, some of said stiffening flanges being tapered to merge into the respective walls.

41. A car truck side frame involving a sheet metal outer wall and a sheet metal inner wall, each of said walls having a plurality of top arch bar portions, a plurality of bottom arch portions, and a plurality of pedestal tie bar portions, said bottom arch bar portions of said outer and inner walls being provided with stiffening flanges, the said stiffening flanges being reduced in height at the junction of said bottom arch bar portions with said pedestal tie bar portions.

42. A car truck side frame involving an outer wall of sheet metal and an inner wall of sheet metal, each of said walls involving pedestal tie bar portions and being provided with stiffening flanges which merge with the respective side walls adjacent said pedestal tie bar portions.

43. A car truck side frame comprising top arch bar portions, bottom arch bar portions, pedestal tie bar portions, and truck columns integrally connected to said several portions, said bottom arch bar portions each being formed with an outer wall and with an inner wall in spaced relation to said outer wall, and said walls being of increased width adjacent their junction with the respectively adjacent truck column portions and pedestal tie bar portions.

44. A car truck side frame involving a sheet metal outer wall and a sheet metal inner wall spaced with relation thereto, each of said walls having a plurality of truck column portions, a plurality of top arch bar portions, a plurality of bottom arch bar portions, and a plurality of pedestal tie bar portions, said bottom arch bar portions being of increased width adjacent their points of junction with the respectively adjacent truck columns portions and pedestal tie bar portions.

45. A car truck side frame involving a sheet metal outer wall and a sheet metal inner wall spaced with relation thereto, each of said walls being provided with a bolster opening, a plurality of top arch bar portions and a plurality of bottom arch bar portions sloping downwardly from said top arch bar portions toward the lower ends of said bolster openings, said bottom arch bar portions being gradually increased in width toward the lower ends of said bolster openings.

46. A car truck side frame involving a plurality of top arch bar portions, a plurality of bottom arch bar portions sloping downwardly therefrom, and a plurality of truck column portions, said bottom arch bar portions being of gradually increasing width in the plane of the truck side frame adjacent said truck column portions.

47. A car truck side frame involving a continuous sheet of metal constituting an outer wall and an inner wall, said sheet being folded at the upper edge of said frame, and said fold being in a straight line.

48. A car truck side frame involving a continuous sheet of metal having a fold spacing portions of said sheet to form an outer wall and an inner wall, said fold being straight throughout its length.

49. A car truck side frame involving a sheet metal outer wall and a sheet metal inner wall, each of said walls having portions adapted to extend over respective journal boxes, and reinforcing members located between and secured to said walls above the respective journal boxes.

50. A car truck side frame involving a sheet metal outer wall and a sheet metal inner wall, each of said walls having portions adapted to extend over respective journal boxes, the said portions being respectively provided with flanges extending toward each other, and reinforcing members located between and secured to said walls above said flanges.

51. A car truck side frame involving a plurality of truck column portions, a plurality of top arch bar portions, and a plurality of bottom arch bar portions, said bottom arch bar portions each having spaced side walls and a bottom wall, the bottom walls of said bottom arch bar portions being provided with drainage openings.

52. A car truck side frame having a plurality of truck column portions, a plurality of top arch bar portions and a plurality of bottom arch bar portions, each of said bottom arch bar portions having side walls and a web connecting said side walls, said web being formed with an opening located substantially equi-distant from said side walls.

53. A car truck side frame having a plurality of truck column portions, a plurality of top arch bar portions and a plurality of bottom arch bar portions, said bottom arch bar portions being of channel cross section and being provided with openings in the webs of said channel located approximately at the midline of the latter.

54. A car truck side frame having a plurality of truck column portions, a plurality of top arch bar portions, a plurality of bottom arch bar portions, and a plurality of pedestal tie bar portions, each of said pedestal tie bar portions being for a part of their lengths formed with spaced side walls, and a bottom wall connecting said side walls, the said bottom wall being formed with openings located substantially at the midline of said tie bar portions.

55. A car truck side frame having pedestal tie bar means adapted to be connected to the journal boxes of a truck, said pedestal tie bar means having a portion formed with side walls and a bottom wall connecting said side walls, said bottom wall having a plurality of openings therein located substantially equi-distant from said side walls.

56. A car truck side frame involving a sheet metal outer wall and a sheet metal inner wall, said outer wall being provided with a plurality of spaced bridging lugs extending toward said inner wall, and said inner wall being provided with correspondingly spaced bridging lugs extending toward said outer wall, said lugs being welded together.

57. A car truck side frame involving a sheet metal outer wall and a sheet metal inner wall, said walls being provided with top arch bar portions and bottom arch bar portions, said bottom arch bar portions of said outer wall being provided with a plurality of spaced bridging lugs which extend toward said inner wall, and said bottom arch bar portions of said inner wall being provided with correspondingly spaced bridging lugs which extend toward said outer wall, the said bridging lugs being welded together.

58. A car truck side frame involving a sheet metal outer wall and a sheet metal inner wall spaced with relation thereto, each of said walls being provided with stiffening flanges located between said walls, each of said flanges extending not more than half the distance toward the opposite wall.

59. A car truck side frame involving a sheet metal outer wall and a sheet metal inner wall spaced with relation thereto, each of said walls being provided with a stiffening flange located between said walls, each of said flanges extending not more than half the distance toward the opposite wall and being united by welding.

60. A car truck side frame involving a continuous sheet of metal constituting an outer wall and an inner wall in spaced relation to said outer wall, each of said walls being formed with a plurality of top arch bar portions, a plurality of bottom arch bar portions united at one end to said top arch bar portions, and a plurality of truck column portions uniting said top and bottom arch bar portions, the lower sides of said top arch bar portions being sloped downwardly toward the respectively adjacent ends of the side frame.

61. A car truck side frame involving a continuous sheet of metal constituting an outer wall and an inner wall in spaced relation to said outer wall, each of said walls being formed with a plurality of top arch bar portions having lower sides which slope downwardly toward the respectively adjacent ends of the side frame.

62. A car truck side frame involving a continuous sheet of metal constituting an outer wall and an inner wall in spaced relation to said outer wall, each of said walls having a top arch bar portion and a bottom arch bar portion, said top arch bar portion being of greater depth at a point adjacent said bottom arch bar portion than at points nearer the center of the side frame.

63. The method of manufacturing a car truck side frame involving the following steps, namely; forming from a sheet of metal a blank having corresponding side frame portions symmetrically disposed with respect to an axis of symmetry passing between them, bending corresponding portions of said blank to form flanges which project from the same side thereof, and folding said blank along a line which throughout its length is parallel to the said axis of symmetry.

64. The method of manufacturing a car truck said frame involving the following steps, namely; forming from a sheet of metal a blank having corresponding side frame portions disposed on opposite sides of a straight line forming an axis of symmetry of the blank, bending corresponding portions of said blank to form flanges which project from the same side thereof, folding said blank on opposite sides of the axis of symmetry along straight lines parallel with said axis throughout, and uniting said flanges by welding.

65. The steps in making a pressed metal truck side frame of integral form, consisting in cutting a plain plate to the shape desired with portions which are ultimately to form certain flanges provided with projections, then flanging various portions thereof including those provided with the projections aforesaid, then bending the plate about its intermediate portion and placing the projecting portions of each half of the plate opposite each other, and then welding said projections together.

In testimony whereof, I affix my signature.

GUSTAF ARVID ANDERSON.